United States Patent [19]

Horian et al.

[11] 4,100,643
[45] Jul. 18, 1978

[54] MAGNETIC TAPE SENSING HEAD CLEANER

[76] Inventors: Richard C. Horian, 1740 Strickland Dr., Bloomfield Hills, Mich. 48013; James G. Horian, 7340 Indiana, Dearborn, Mich. 48126

[21] Appl. No.: 807,699

[22] Filed: Jun. 20, 1977

[51] Int. Cl.² .............................................. G11B 3/58
[52] U.S. Cl. ...................................... 15/246; 15/97 R; 206/229
[58] Field of Search .................. 15/93 R, 97 R, 210 R, 15/246; 274/47; 206/229, 230; 220/345, 346; 242/199

[56] References Cited

U.S. PATENT DOCUMENTS

| | | | |
|---|---|---|---|
| 1,981,688 | 11/1934 | Conti | 15/28 |
| 3,362,564 | 1/1968 | Mueller | 220/346 |
| 3,439,922 | 4/1969 | Howard | 15/210 R X |

*Primary Examiner*—Edward L. Roberts
*Attorney, Agent, or Firm*—Reising, Ethington, Barnard, Perry & Brooks

[57] ABSTRACT

A magnetic tape sensing head cleaner disclosed has a hollow housing including a pair of housing members that are selectively latchable to each other in a closed position and releasable therefrom to permit replacement of a cleaning loop received by a track within the housing. Latching portions formed integrally with the housing members during plastic molding thereof cooperate in pairs to provide wedging latches that secure the housing members to each other in the closed position and permit repeated separation thereof for replacement of the cleaning loop. The track that receives the cleaning loop is preferably located within a cleaning loop compartment at one end of the housing and includes a drive roller, a pressure pad, and a guide loop around which the cleaning loop is driven. Adjacent another end of the housing, a storage compartment is defined for a cleaning brush, a cleaning probe, cleaning probe tips, and a cleaning fluid bottle. One of the housing members is molded from opaque plastic and includes a bottom wall, an apertured end wall through which the cleaning action by the cleaning loop takes place, side walls connected to the end and bottom walls, and an intermediate wall that connects the side walls and separates the cleaning loop and storage compartments. The other housing member is molded from clear plastic and includes a top wall and an end wall oriented in a perpendicular relationship to each other. Side edges of the top wall on the second housing member and the side walls of the first housing member mount the latching portions that are used to secure the housing members to each other.

6 Claims, 4 Drawing Figures

MAGNETIC TAPE SENSING HEAD CLEANER

BACKGROUND OF THE INVENTION

1. Field Of The Invention

This invention relates to a magnetic tape sensing head cleaner.

2. Description Of The Prior Art

Magnetic tape sound reproduction equipment conventionally includes a metallic sensing head that senses recordings on magnetic tapes to generate an electric signal that reproduces sound. Such sensing heads must be cleaned after about every eight hours of use in order to maintain good fidelity. In order to provide such cleaning, cartridges or cassettes having continuous cleaning loops instead of magnetic tapes are mounted on the equipment adjacent the sensing head and operated in the same way a tape cartridge or cassette is operated to provide a cleaning movement of the loop over the head. Cleaning fluid is preferably applied to the cleaning loop before use to enhance its cleaning action. After some period of use, the cleaning loop becomes dirty and/or becomes worn so as to no longer be usable. Since housing members of the cartridge or cassette that receives the cleaning loop are conventionally secured to each other permanently, the whole cleaning unit must then be thrown away and another purchased.

Maintenance cleaning of magnetic tape sound reproduction must also be performed every month or so regardless of the amount of use to remove atmospheric contaminants that settle on the equipment such as dust, and other grit and accumulation. Such cleaning usually requires brushing of the area around the sensing head as well as cleaning thereof by a probe felt tip dampened with cleaning fluid. Many tape sound systems are portable or utilized with vehicles such that organization of the cleaning materials, i.e., a brush, a probe, probe tips, and a cleaning fluid bottle, etc., is very important if the required cleaning is to be performed on a regular schedule.

SUMMARY OF THE INVENTION

An object of the present invention is to provide a magnetic tape sensing head cleaner having a hollow housing including a track for receiving a replaceable cleaning loop that is enclosed during use but accessible for replacement by releasing housing members that are latched to each other.

In carrying out the above object, wedging latches including latching portions formed integrally with the housing members are utilized to secure the housing members to each other. Relative movement between the housing members in one direction engages cooperable pairs of the latching portions to secure the housing members relative to each other in a closed position. Relative movement of the housing members with respect to each other in the opposite direction disengages the cooperable pairs of the latching portions to permit the movement of the housing members to an open position. As disclosed, the housing members are separable upon movement to the open position.

Cleaning loop and storage compartments are preferably defined by the housing with the housing members latched to each other in the closed position. The cleaning loop compartment receives the track over which the loop is trained for movement around a drive roller, a pressure pad, and a guide lug such that cleaning action can take place as the loop is driven thereabout. Cleaning materials including tools and supplies are positioned within the storage compartment of the housing so as to provide an organized unit.

In the preferred embodiment, a first housing member is molded from opaque plastic and includes a bottom wall, an apertured end wall adjacent the cleaning compartment so that cleaning action can take place therethrough, side walls that extend from the apertured end wall connected to the bottom wall, and an intermediate wall that connects the side walls and separates the cleaning loop and storage compartments. A second housing member is preferably molded from a clear plastic and includes perpendicular top and end walls that respectively oppose the bottom and end walls of the first housing member. Outer edges of the side walls on the first housing member and side edges of the top wall on the second housing member preferably mount the latching portions that are engaged during movement of the end walls toward each other to wedge the housing members to each other. Movement of the end walls away from each other disengages the latching portions to permit separation of the housing members. As this movement takes place in both directions, the side walls of the first housing member and the side edges on the top wall of the second housing member slidably engage each other.

Positioning lugs formed on the bottom wall of the first housing member within the storage compartment are provided to locate a brush and a cleaning probe. The brush has a bristled end and a connector end while the probe has a tip socket end and a connector end. Interfitting of the connector ends of the brush and the probe increases the length of each to facilitate their use. A plurality of the felt cleaning probe tips are located within a subcompartment provided by positioning walls on the bottom wall of the storage compartment. Similarly, a cleaning fluid bottle is also located within the storage compartment by positioning walls on the bottom wall of the first housing member.

The objects, features, and advantages of the present invention are readily apparent from the following detailed description of the preferred embodiment taken in connection with the accompanying drawings.

DETAILED DESCRIPTION OF THE PREFERRED EMBODIMENT

Figure 1:
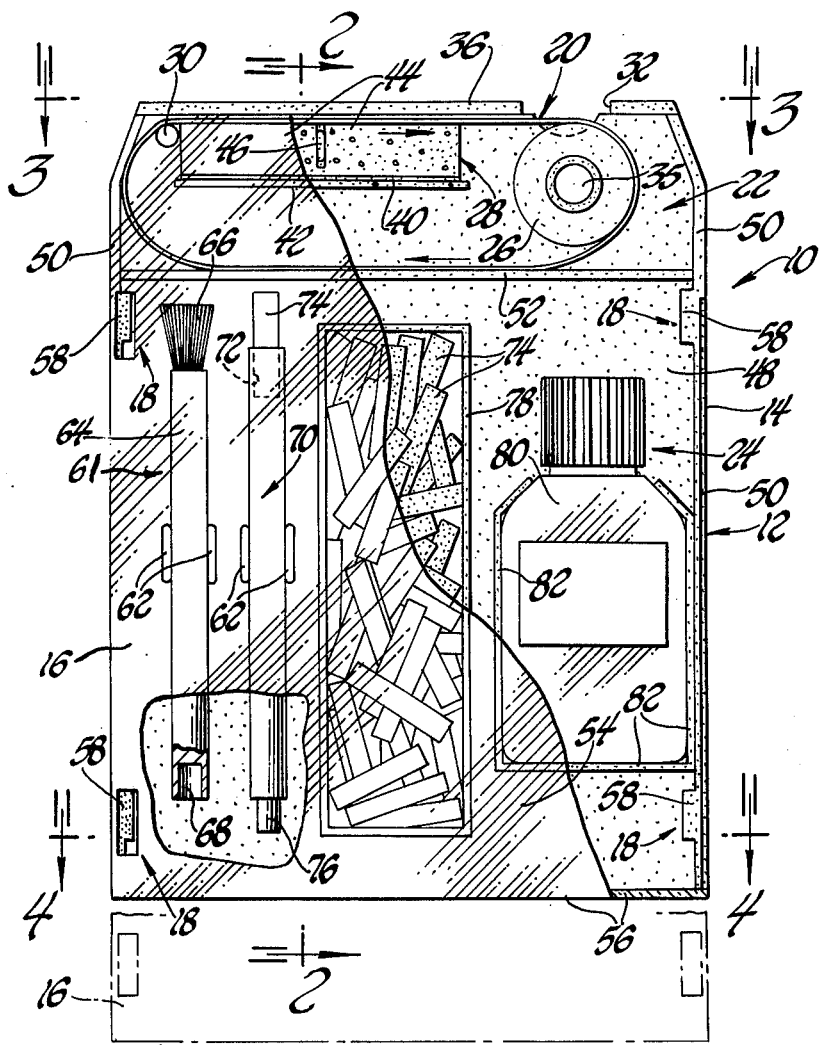
FIG. 1 is a partially broken away view of a magnetic tape sensing head cleaner constructed according to the present invention.

With reference to FIG. 1, a magnetic tape sensing head cleaner according to the present invention is generally indicated by 10 and includes a molded plastic housing 12 that consists of a first opaque housing member 14 and a second clear plastic housing member 16. Wedging latches 18 are provided for selectively securing the housing members to each other in the closed position shown by solid lines and for permitting separable movement thereof to an open position shown by phantom lines so that a continuous cleaning loop 20 within the housing can be replaced.

Figure 3:
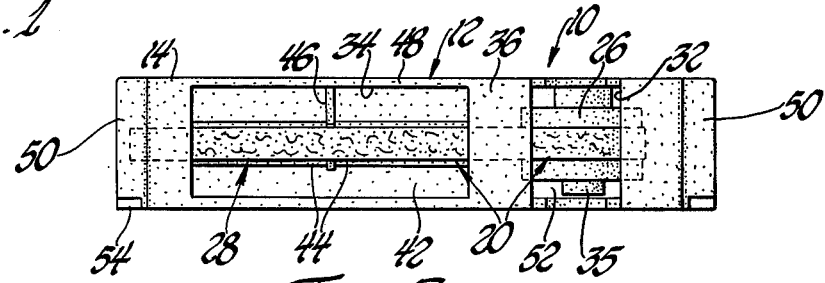
FIG. 3 is a view of the cleaner taken along line 3—3 of FIG. 1.

As best seen by continuing reference to FIG. 1, the cleaner housing 12 defines a cleaning loop compartment 22 and a storage compartment 24 which are both enclosed with the two housing members 14 and 16 secured to each other in the closed position. Cleaning loop 20 is received within the compartment 22 by a track including a rubber drive roller 26, a pressure pad 28, and a guide lug 30. Apertures 32 and 34 (see FIG. 3) are formed in an end wall 36 of the housing portion 14 and insertion of the cleaner within a tape playing slot causes the drive roller 26 to be driven about an integral pin 35 of housing member 14 through the aperture 32 such that the cleaning loop 20 is pulled over the pressure pad 28 past the aperture 34. This movement of the cleaning loop allows a tape sensing head positioned within aperture 34 to be cleaned by the loop in order to maintain the fidelity of the sound produced. As cleaning loop 20 is pulled over the pressure pad 28, it first passes over guide lug 30 which is integrally molded on one or both of the housing members 14 and 16. Pressure pad 28 includes a strip 40 that is engaged with a wall 42 of housing member 14. Spaced foam members 44 of pad 28 are adhesively secured to strip 40 to provide resilient pressure to the cleaning loop 30 and have a positioning tab 46 of housing member 14 received therebetween in order to properly locate the pressure pad while permitting replacement thereof when necessary.

Figure 2:
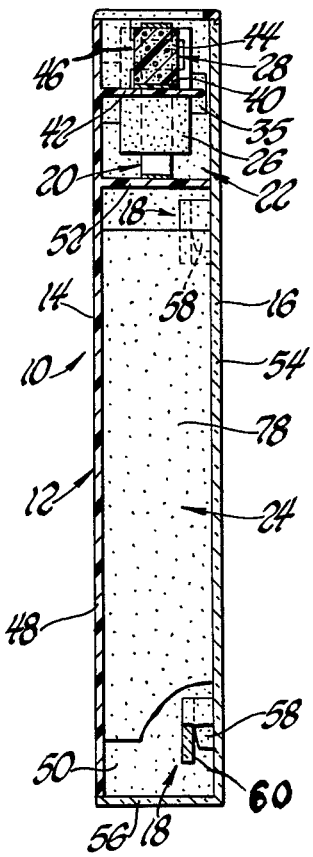
FIG. 2 is a sectional view of the cleaner taken along line 2—2 of FIG. 1.

Opaque housing member 14 includes a bottom wall 48 from which the apertured end wall 36 extends in a perpendicular relationship. Side walls 50 also extend from the bottom wall 48 in a perpendicular relationship thereto and are connected with the apertured end wall 36 at spaced locations with a slightly pointed configuration defined adjacent the cleaning loop compartment 22 in order to provide a guiding action during insertion of the cleaner for use. An intermediate wall 52 of housing member 14 extends between the side walls 50 thereof and projects from the bottom wall 48 in a perpendicular relationship. During use, the cleaning loop 20 slides along the top side of the intermediate wall 52 as it moves from the roller 26 toward the left to the guide lug 30. Cleaning loop compartment 22 and storage compartment 24 are separated by this intermediate wall as best seen in FIGS. 1 and 2.

Figure 4:
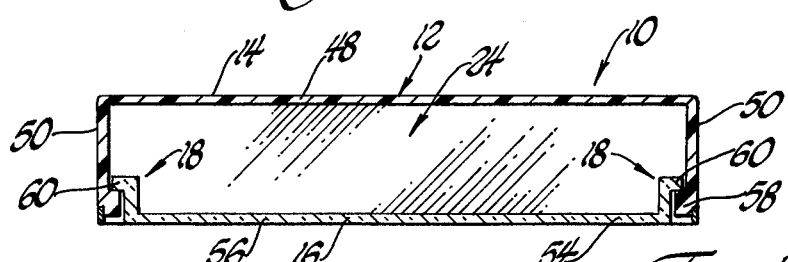
FIG. 4 is a sectional view of the cleaner taken along line 4—4 of FIG. 1.

Clear plastic housing member 16 includes perpendicular top and end walls 54 and 56 that respectively oppose the bottom wall 48 and the apertured end wall 36 of the housing member 14. Wedging latches 18 include somewhat curved latching portions 58 (see the bottom portion of FIG. 2) formed at the inner sides of the outer edges on side walls 50 of the housing member 14. Likewise, cooperable latching portions 60 of the wedging latches are integrally molded on side edges of the top wall 54 of housing member 16 as best seen in FIG. 4. Relative movement between the housing members 14 and 16 to the phantom line indicated position of FIG. 1 so that their end walls 36 and 56 move away from each other disengages the cooperable latching portions 58 and 60 to permit spearation of the housing members. Relative movement between the housing members in the opposite direction to the solid line indicated closed position of FIG. 1 so that the end walls 36 and 56 move toward each other slidably engages the latching portions with a wedging action due to the curvature of the latching portions 58 in order to secure the housing members to each other. As this movement takes place in both directions, the side walls 50 of housing member 14 slidably engage the side edges on the top wall 54 of housing member 16. Opening and closing of the housing can be performed repeatedly as necessary.

Within the storage compartment 24, the bottom wall 48 of housing member 14 includes two pairs or positioning lugs 62 seen in FIG. 1. A brush 61 has an elongated handle 64 received and positioned between one pair of the lugs 62 with a snap action. One end of the handle 64 has bristles 66 used to clean the area about a magnetic tape sensing head. The other end of handle 64 has a connector socket 68. A probe 70 is positioned between the other pair of positioning lugs 62 also by a snap action and has one end provided with a socket 72 that receives a felt probe tip 74. A connector projection 76 is located at the other end of probe 70. When the housing members 14 and 16 are separated from each other, brush 61 and probe 70 can be removed from between the positioning lugs 62 and interfitted at their socket and projection 68 and 76 to lengthen both the brush handle and the probe. Tips 74 for use with the probe are received within a subcompartment formed by rectangular positioning walls 78 that project upwardly from the bottom wall 48 of housing member 14. Likewise, cleaning fluid for use with both the cleaning loop 20 and the probe tips 74 is stored within a bottle 80 that is located by positioning walls 82 on the bottom wall 48.

All maintenance cleaning normally required with tape sound equipment can be accomplished with the cleaner 10 shown and described. The cost involved is greatly reduced due to the replaceable nature of the cleaning loop 20. Likewise, a highly organized manner of storing all of the cleaning materials necessary to do the cleaning is achieved.

While a preferred embodiment of the cleaner has herein been described in detail, those skilled in this art will recognize various alternative designs and embodiments for practicing the present invention as defined by the following claims.

What is claimed is:

1. A magnetic tape sensing head cleaner comprising: a hollow housing including a pair of housing members; said housing including an intermediate wall dividing the housing into a cleaning loop compartment on one side thereof and a storage compartment on the other side thereof; the housing also including an apertured end wall spaced from the intermediate wall located on said one side thereof; latch means for fixedly securing the housing members to each other in a closed position while selectively permitting repeated relative movement therebetween to an open position and subsequent movement back to as well as securement in the closed position; and said cleaning loop compartment of the housing including a track for receiving a replaceable cleaning loop with the housing members in the open position such that the loop is enclosed when the housing members are subsequently secured to each other in the closed position and moves around the track adjacent the apertured end wall to clean a magnetic tape sensing head positioned adjacent the end wall, the housing members being movable to the open position to permit replacement of the cleaning loop when the loop is no longer capable of cleaning the sensing head.

2. A magnetic tape sensing head cleaner comprising: a hollow housing including a pair of plastic housing members; latch means for normally securing the housing members to each other while selectively permitting repeated separation therebetween and subsequent securement; said housing including an intermediate wall dividing the housing into a cleaning loop compartment on one side thereof and a storage compartment on the other side thereof and said compartments being enclosed by the housing members while secured to each other by the latch means; the housing also including an apertured end wall spaced from the intermediate wall located on said one side thereof; said cleaning loop compartment including a track for receiving a replaceable cleaning loop with the housing members separated such that the loop is enclosed when the housing members are subsequently secured to each other and moves around the track adjacent the apertured end wall to clean a magnetic tape sensing head positioned adjacent the apertured end wall; the housing members being separable to provide access to the storage compartment or to permit replacement of the cleaning loop when the loop is no longer capable of cleaning the sensing head; and cleaning materials received within the storage compartment.

3. A magnetic tape sensing head cleaner comprising: a hollow housing including a pair of molded plastic housing members; a plurality of latches including latching portions molded integrally with the housing members so as to normally secure the housing members to each other while selectively permitting repeated separation therebetween and subsequent securement; said housing including an intermediate wall dividing the housing into a cleaning loop compartment on one side thereof and a storage compartment on the other side thereof and said compartments being enclosed by the housing members while secured to each other by the latches; the housing also including an apertured end wall spaced from the intermediate wall located on said one side thereof; said cleaning loop compartment including a track having a drive roller, a pressure pad, and a guide lug for receiving a replaceable cleaning loop with the housing members separated such that the loop is enclosed when the housing members are subsequently secured to each other and moves around the track adjacent the apertured end wall to clean a magnetic tape sensing head positioned adjacent the apertured end wall; the housing being separable to provide access to the storage compartment or to permit replacement of the cleaning loop when the loop is no longer capable of cleaning the sensing head; and one of the housing portions including positioning portions within the storage compartment for positioning cleaning materials.

4. A magnetic tape sensing head cleaner comprising: a hollow housing including first and second molded plastic housing members; the first housing member having a bottom wall, an apertured end wall extending from the bottom wall in a perpendicular relationship thereto, and a pair of side walls connected to the end wall in a spaced relationship to each other and extending from the bottom wall in a perpendicular relationship thereto; the second housing member including a top wall and an end wall that extends from the top wall in a perpendicular relationship thereto; a plurality of wedging latches including latching portions molded integrally with the housing members; cooperable pairs of said latching portions moving into wedging engagement with each other to fix the housing members to each other in a closed position upon sliding movement of the housing members relative to each other in a first direction that moves the end walls toward each other as the side walls of the first housing member slidably engage the top wall of the second housing member; sliding movement of the housing members relative to each other in a second direction that moves the end walls away from each other disengaging the cooperable pairs of latching portions from each other and moving the housing members to an open position; one of the housing members including an intermediate wall that divides the housing into a cleaning loop compartment adjacent the apertured end wall of the first housing member and a storage compartment for cleaning materials adjacent the end wall of the second housing member; and said cleaning loop compartment including a track having a drive roller and a pressure pad for receiving a replaceable cleaning loop with the housing members in open position such that the cleaning loop is enclosed when the housing members are subsequently secured to each other in the closed position and moves around the track adjacent the apertured end wall to clean a magnetic tape sensing head positioned adjacent the apertured end wall, the housing members being separable to provide access to the storage compartment or to permit replacement of the cleaning loop when the loop is no longer capable of cleaning the sensing head.

5. A magnetic tape sensing head cleaner comprising: a hollow housing including first and second molded plastic housing members; the first housing member being molded from opaque plastic and having a bottom wall, an apertured end wall extending from the bottom wall in a perpendicular relationship thereto, a pair of side walls connected to the end wall in a spaced relationship to each other and extending from the bottom wall in a perpendicular relationship thereto, and an intermediate wall extending between the side walls; the second housing member being molded from clear plastic and including a top wall and an end wall that extends from the top wall in a perpendicular relationship thereto; a plurality of wedging latches including latching portions molded integrally with the housing members on the side walls of the first housing member and the top wall of the second housing member; cooperable pairs of said latching portions moving into wedging engagement with each other to secure the housing members to each other upon sliding movement of the housing members relative to each other in a first direction that moves the end walls toward each other as the side walls of the first housing member slidably engage the top wall of the second housing member; sliding movement of the housing members relative to each other in a second direction that moves the end walls away from each other disengaging the cooperable pairs of latching portions from each other to permit separation of the housing members; the first and second housing members cooperating when secured to each other to define a cleaning loop compartment on one side of said intermediate wall of the first housing member adjacent the apertured end wall thereof and a storage compartment on the other side of the intermediate wall adjacent the end wall of the second housing member; said cleaning loop compartment including a track having a drive roller, a pressure pad, and a guide lug; a replaceable cleaning loop received by the track for driven movement thereabout by the roller adjacent the apertured end wall to clean a magnetic tape sensing head positioned adjacent the apertured end wall; the housing members being separable to provide access to the storage compartment or to permit replacement of the cleaning loop when the loop is no longer capable of cleaning the sensing head; and said storage compartment including tool positioning lugs on the bottom wall of the first housing member and also including positioning walls on said bottom wall for locating cleaning probe tips and a cleaning fluid bottle.

6. A cleaner as in claim 5 further including a brush securable by the positioning lugs and having an elongated handle with a first end having bristles and a second connector end, an elongated probe also securable by the positioning lugs and having a first end with a cleaning tip socket and a second connector end, said connector ends interfitting with each other to lengthen the brush and the probe, and a plurality of cleaning probe tips and a cleaning fluid bottle located within the storage compartment by the positioning walls on the bottom wall of the first housing member.

* * * * *